United States Patent [19]

Tinsler

[11] Patent Number: 5,040,953
[45] Date of Patent: Aug. 20, 1991

[54] MOUNTING SYSTEM
[75] Inventor: Theodore E. Tinsler, Sidney, Ohio
[73] Assignee: Copeland Corporation, Sidney, Ohio
[21] Appl. No.: 563,679
[22] Filed: Aug. 3, 1990

Related U.S. Application Data

[63] Continuation of Ser. No. 246,437, Sep. 19, 1988, abandoned.

[51] Int. Cl.$^5$ .............................................. F04B 39/14
[52] U.S. Cl. ..................................... 417/363; 417/360; 248/638; 248/632; 248/634
[58] Field of Search ........................ 417/360, 363, 902; 248/618, 632, 634, 638; 267/140, 140.5, 141.2, 141.3, 141.4, 141.5, 153, 141, 292

[56] References Cited

U.S. PATENT DOCUMENTS

| 2,326,360 | 8/1943 | Ingersoll | 417/363 X |
| 2,865,586 | 12/1958 | Paulsen | 267/141.4 |
| 2,951,674 | 9/1960 | Rice | 267/141.4 |
| 3,162,723 | 12/1964 | McCurtain | 248/632 X |
| 4,218,599 | 8/1980 | Garn | 267/140 |
| 4,406,591 | 9/1983 | Louis | 417/363 |
| 4,442,367 | 4/1984 | Suzuki | 248/632 X |
| 4,461,446 | 7/1984 | Hannibal et al. | 248/638 X |
| 4,553,231 | 11/1985 | d'Alayer de Costemore d'Arc | 248/638 X |
| 4,632,642 | 12/1986 | Meister, III et al. | 248/632 X |
| 4,643,386 | 2/1987 | Chastine | 248/634 X |
| 4,681,288 | 7/1987 | Nakamura | 248/73 X |
| 4,705,257 | 11/1987 | Leo et al. | 248/638 X |
| 4,744,547 | 5/1988 | Hartel | 267/141 |
| 4,806,437 | 2/1989 | Yokoi et al. | 267/153 |
| 4,871,300 | 10/1989 | Outzen | 417/363 |

FOREIGN PATENT DOCUMENTS

| 1298250 | 5/1962 | France . | |
| 61-59039 | 3/1986 | Japan . | |
| 2089465 | 6/1982 | United Kingdom | 248/634 |

Primary Examiner—Leonard E. Smith
Assistant Examiner—Eugene L. Szczecina, Jr.
Attorney, Agent, or Firm—Harness, Dickey & Pierce

[57] ABSTRACT

A suspension system for a refrigeration condensing unit which utilizes a simple unique elastomeric spacer instead of conventional multiple-piece spring arrangements.

30 Claims, 1 Drawing Sheet

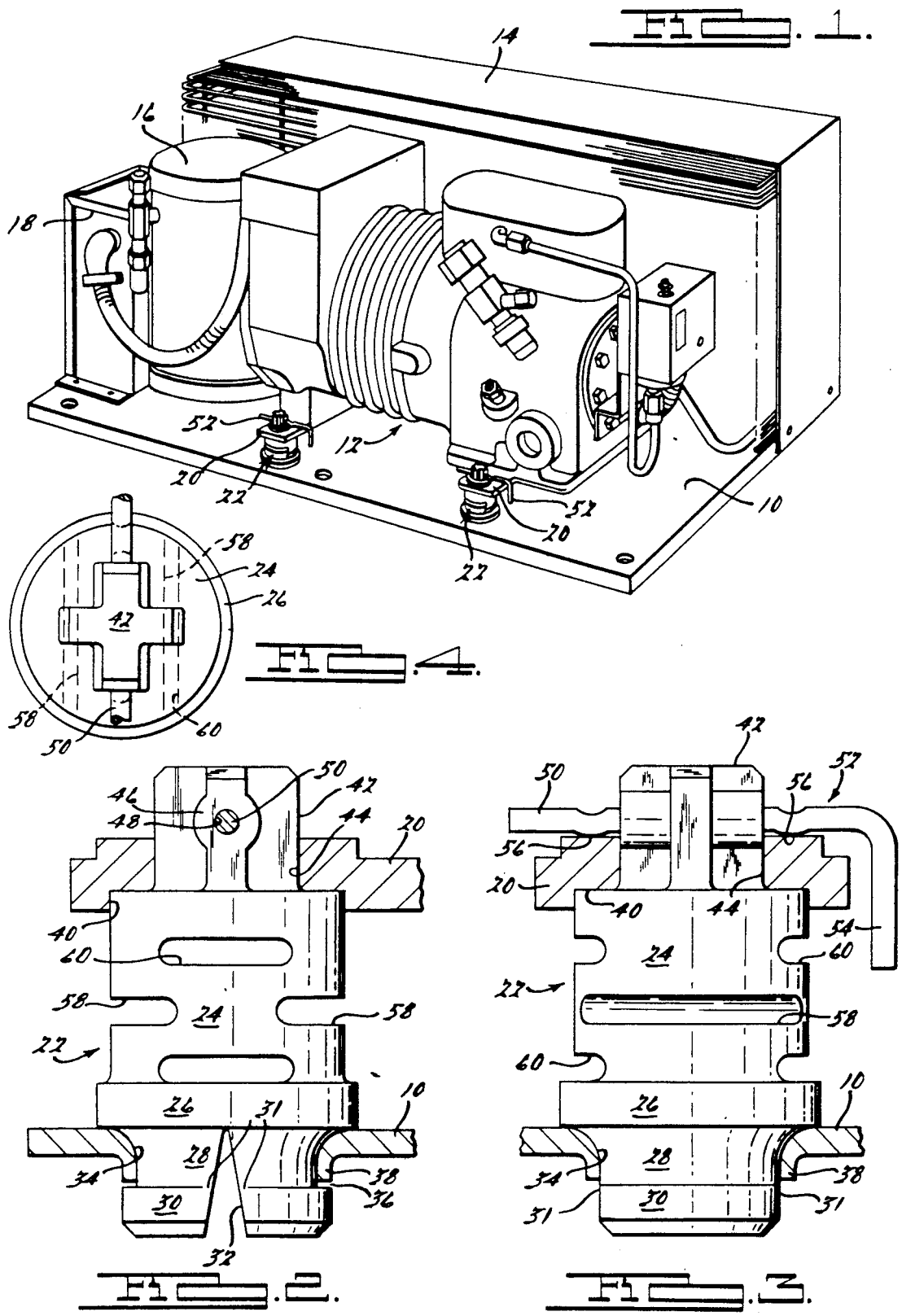

MOUNTING SYSTEM

This is a continuation of U.S. patent application Ser. No. 246,437, filed Sept. 19, 1988 now abandoned.

BACKGROUND AND SUMMARY OF THE INVENTION

This invention relates to mounting and suspension systems, and more particularly to a system for mounting a motor-compressor to a refrigeration condensing unit.

Motor-compressors are conventionally mounted to such units using a spring suspension system to attenuate noise and vibration. These known systems are adequate, but suffer the disadvantage that they generally comprise a large number of separate pieces (often more than thirty per motor-compressor), and thus are relatively expensive to fabricate and assemble. In addition, spring suspensions are sometimes so soft that the excessive motion caused by starting and stopping of the compressor can damage the connecting refrigerant tubes. The softness of spring suspensions also usually requires that a shipping constraint be provided to prevent excessive motion of the motor-compressor during shipment. This increases cost and inconveniences the customer who must then remove the constraint.

It is the primary object of the present invention to provide an extremely simple and cost effective mounting system which avoids the problems associated with the aforementioned known systems.

Additional advantages and features of the present invention will become apparent from the subsequent description and the appended claims taken in conjunction with the accompanying drawings.

BRIEF DESCRIPTION OF THE DRAWINGS

FIG. 1 is a perspective view of a refrigeration condensing unit embodying the principles of the present invention;

FIG. 2 is an enlarged fragmentary vertical section view showing an assembled mounting spacer of the present invention in a relaxed state;

FIG. 3 is a view similar to FIG. 2 but rotated 90° with respect thereto; and

FIG. 4 is a top plan view of the spacer of the present invention.

DESCRIPTION OF THE PREFERRED EMBODIMENT

With reference to FIG. 1, there is illustrated a refrigeration condensing unit embodying the mounting system of the present invention. The unit generally comprises a rigid base 10, a semi-hermetic motor-compressor 12, a condensing heat exchanger and fan assembly 14, a receiver 16 and an electrical box 18, all interconnected in the usual way. Compressor 12 has four feet 20 (two of which are shown) projecting laterally outwardly from the bottom thereof for mounting the motor-compressor on base 10.

The present invention resides in the provision of unique spacers, identified at 22, for resiliently mounting or suspending motor-compressor 12 with regard to base 10. Each spacer 22 is formed of an elastomeric material, such as a thermoplastic polyester elastomer comprised of a hard segment of polybutylene terephthalate (PBT) and a soft segment of polyethelene terephthalate (PET) (for example "Hytrel 4074" supplied by DuPont de Nemours located at Wilmington, Delaware), and is preferably inexpensively fabricated by injection molding. It should be a relatively hard material, i.e. in the order of 40D durometer. In shape, each spacer 22 has a generally circular cylindrical main body portion 24 integrally formed with a lower support flange 26 from which downwardly projects a radiused mounting projection 28 having an enlarged terminal head portion 30, projection 28 and head 30 having a diametrical upwardly extending V-shaped slot 32 therethrough (FIG. 2).

Spacer 22 is assembled to base 10 by forcing projection 28 and head 30 through an extruded contoured hole 34 in base 10 until flange 26 seats on the base. Slot 32 permits the projection and cap to collapse enough to facilitate assembly, and thereafter cap 30 re-expands to prevent inadvertent removal of the spacer. Cap 30 is relieved at the ends of slot 32, as at 31, to facilitate assembly. A minimal clearance, such as at 36, is provided between cap 30 and the bottom of base 10 (or the small flange 38 formed when forming hole 34, as shown in FIGS. 2 and 3) to restrict vertical movement of spacer 22 in hole 34. Projection 28 and hole 34 are preferably given the complementary contoured shape illustrated in FIG. 2 and 3. The radiused entrance to hole 34 facilitates insertion of the spacer, and the smooth walls thereof prevent abrasion of the spacer. Spacer 22 is preferably aligned so that slot 32 is generally parallel to the crankshaft of the motor-compressor so as to minimize the tendency of vibrational forces rocking spacer 22 out of hole 44 (i.e., the two relieved portions 31 on cap 30 on each side of slot 32 are disposed in planes parallel to the crankshaft axis, as is shown).

The upper end of spacer main body portion 24 is nested in a counterbore 40 formed in each foot 20 and has projecting upwardly therefrom a post 42 of cross-shaped cross-section which extends through a round hole 44 in foot 20. Post 42 has a transverse tubular portion 46 having a transverse hole 48 in which is disposed the long leg 50 of an L-shaped locking pin 52, the short leg 54 of which serves as a handle. With spacer 22 in place, assembly is effected by lowering the compressor on to the spacers with a post 42 extending up through hole 44 in each foot 20. A locking pin 52 is then manually press fit through each hole 48. Pin 52 and spacer 22 are preferably orientated so that leg 50 of pin 52 is generally parallel to the axis of the compressor crankshaft so that the major vibration component of the motor-compressor does not tend to shake pin 52 out of hole 48, as best shown in FIGS. 2 and 3. Also, a pair of bumps 56 are formed in leg 50 to help prevent pin 52 from working out of hole 48 (they provide a friction/interference fit in hole 48). The entire assembly process, which involves only eight mounting pieces, can thus be accomplished without the use of tools, both ends of the spacer being champhered as shown to facilitate this assembly. Disassembly for repairs or the like can be similarly effected.

The degree of vibration and sound attenuation, and the frequencies attenuated, are controlled by providing in body portion 24 slots and/or openings of desired size, shape, number and location, all of which effect the hardness or spring rate of the spacer. In the embodiment illustrated there are provided a pair of oppositely disposed generally horizontal slots 58 and a pair of generally flat spaced horizontal through-openings 60, rotated approximately 90° with respect to slots 58 and slightly overlying same. The arrangement shown has been found to be ideal in that it provides for a higher spring rate in the horizontal direction than in the vertical direction, and it is an easy to mold part (can use a simple two-piece mold without cams, etc.) which yields much design freedom in controlling softness or spring rate. To reduce spring rate it is only necessary to increase the width of through-openings 60 or the depth of slots 58 to increase the degree of overlap of the two. For a given application the proper configuration can be achieved by starting with small slots and openings and then progressively increasing them in size until the desired amount of attenuation is obtained, using trial and error techniques.

While it is apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. A condensing unit comprising a rigid base, a plurality of elastomeric spacers affixed to said base in a manner such that said base and said spacers maintain positional relationship independent of any other element, said base and said spacers being detachably connected so that inadvertent removal is prevented and said spacers being capable of sustaining tension and compression loads, and a motor-compressor detachably affixed to said spacers, said spacers comprising the sole supporting connection between said motor-compressor and said base.

2. A condensing unit as claimed in claim 1, wherein each said spacer has an integral bottom projection which projects downwardly through a hole in said base.

3. A condensing unit as claimed in claim 2, wherein said hole has a radiused upper edge and the wall of said hole is relatively smooth.

4. A condensing unit as claimed in claim 3, wherein said projection has a contour complementary in shape to that of said hole, as viewed in vertical section.

5. A condensing unit as claimed in claim 2, further comprising an integral head on the lower end of said projection, a portion of said head having an outside dimension slightly larger than that of said hole to prevent easy removal of said projection from said hole.

6. A condensing unit comprising a rigid base, a plurality of elastomeric spacers affixed to said base, each said spacer having an integral bottom projection which projects downwardly through a hole in said base, an integral head on the lower end of said projection, a portion of said head having an outside dimension slightly larger than that of said hole to prevent easy removal of said projection from said hole, said head portion having an upper surface which is closely spaced from the bottom edge of said hole, and a motor-compressor affixed to said spacers, said spacers comprising the sole supporting connection between said motor-compressor and said base.

7. A condensing unit as claimed in claim 5, further comprising means defining a generally vertically disposed slot through said projection and head to permit collapsing of the latter during assembly.

8. A condensing unit as claimed in claim 7, wherein said slot is diametrically located and is of generally inverted V-shape.

9. A condensing unit as claimed in claim 1, further comprising means defining a supporting flange on each said spacer disposed on the upper surface of said base.

10. A condensing unit as claimed in claim 1, wherein each said spacer has an integral vertically extending top post and said motor-compressor has a plurality of mounting feet each having a hole therethrough in which one of said top posts is disposed.

11. A condensing unit as claimed in claim 10, further comprising means defining a counterbore in the bottom of each of said feet, said spacer being nested therein.

12. A condensing unit comprising a rigid base, a plurality of elastomeric spacers affixed to said base, each said spacer having an integral vertically extending top post which is cross-shaped in horizontal cross-section, and a motor-compressor affixed to said spacers, said motor-compressor having a plurality of mounting feet each having a hole therethrough in which one of said top posts is disposed, said spacers comprising the sole supporting connection between said motor-compressor and said base.

13. A condensing unit comprising a rigid base, a plurality of elastomeric spacers affixed to said base, each said spacer having an integral vertically extending top post, means defining a generally horizontal transverse bore through said post above the surface of said foot, a locking pin dispersed in said bore, and a motor-compressor affixed to said spacers, said motor-compressor having a plurality of mounting feet each having a hole therethrough in which one of said top posts is disposed, said spacers comprising the sole supporting connection between said motor-compressor and said base.

14. A condensing unit as claimed in claim 13, wherein said pin is held in said bore by a friction/interference fit.

15. A condensing unit as claimed in claim 13, wherein said pin has at least one bump thereon which has a vertical dimension equal to or slightly greater than the normal distance between the upper surface of said foot and said bore, whereby rotation of said pin will cause said bump to tightly frictionally engage the upper surface of said foot to further hold the assembly together.

16. A condensing unit as claimed in claim 13, wherein there are two of said bumps, one on each side of said post, outwardly thereof.

17. A condensing unit as claimed in claim 1, wherein said spacer is formed of a thermoplastic polyester elastomer.

18. A condensing unit as claimed in claim 17, wherein said elastomer is comprised of a hard segment of polybutylene terephthalate (PBT) and a soft segment of polyethelene therephthalate (PET).

19. A condensing unit as claimed in claim 1, wherein said spacer has at least one transverse through-opening to alter the noise and vibration attenuation characteristics thereof.

20. A condensing unit as claimed in claim 1, wherein said spacer has at least one transverse peripheral slot to alter the noise and vibration attenuation characteristics thereof.

21. A condensing unit as claimed in claim 1, wherein said spacer has at least one transverse through-opening and one transverse peripheral slot to alter the noise and vibration attenuation characteristics thereof.

22. A condensing unit as claimed in claim 21, wherein said spacer has a plurality of said openings and slots.

23. A condensing unit as claimed in claim 21, wherein said slot and through-opening overlap one another.

24. A condensing unit as claimed in claim 1, wherein said spacer has a higher spring rate in the horizontal direction than in the vertical direction.

25. An elastomeric spacer for resiliently supporting a motor-compressor on a rigid base, said spacer having an integral bottom projection which is adapted to project downwardly through a hole in said base in manner such that said base and said spacer maintain positional relationship independent of any other element, said base and said spacer being detachably connected so that inadvertent removal is prevented, and an integral vertically extending top post adapted to extend through a mounting hole on said motor-compressor, and means for detachably affixing said motor-compressor to said top post, said spacer having at least one transverse through-opening and one transverse peripheral slot to alter the noise and vibration characteristics thereof.

26. A spacer as claimed in claim 25, wherein said spacer has a plurality of said openings and slots.

27. A spacer as claimed in claim 25, wherein said slot and through-opening overlap one another.

28. A condensing unit comprising a rigid base, a plurality of elastomeric spacers affixed to said base, and a motor-compressor affixed to said spacers, each said spacer having an integral bottom projection which projects downwardly through a hole in said base, an integral head on the lower end of said projection, said head having an outside dimension slightly larger than that of said hole to prevent easy removal of said projection from said hole, means defining a generally vertically disposed slot through said projection and head to permit collapsing of the latter during assembly, an integral vertically extending top post on said spacer, said motor-compressor having a plurality of mounting feet each having a hole therethrough in which one of said top posts is disposed, means defining a generally horizontal transverse bore through said post above the upper surface of said foot, and a locking pin disposed in said bore.

29. A condensing unit as claimed in claim 28, wherein said spacer is formed of a thermoplastic polyester elastomer.

30. A condensing unit as claimed in claim 28, wherein said spacer has at least one transverse through-opening and one transverse peripheral slot to alter the noise and vibration characteristics thereof.

* * * * *

UNITED STATES PATENT AND TRADEMARK OFFICE
CERTIFICATE OF CORRECTION

PATENT NO. : 5,040,953

DATED : August 20, 1991

INVENTOR(S) : Theodore E. Tinsler

It is certified that error appears in the above-identified patent and that said Letters Patent is hereby corrected as shown below:

Column 1, line 66, "polyethelene" should be -- polyethylene --.

Column 2, line 24, "FIG." should be -- FIGS. --.

Column 2, line 56, "champhered" should be -- chamfered --.

Column 4, line 49, "polyethelen" should be -- polyethylene --.

Column 4, line 49, "therephthalate" should be -- terephthalate --.

Signed and Sealed this

Twelfth Day of January, 1993

*Attest:*

DOUGLAS B. COMER

*Attesting Officer*   *Acting Commissioner of Patents and Trademarks*